United States Patent
Shikata

(10) Patent No.: US 7,957,247 B2
(45) Date of Patent: Jun. 7, 2011

(54) APPARATUS AND METHOD FOR PROCESSING INFORMATION AND PROGRAM THEREFOR

(75) Inventor: Hideto Shikata, Kanagawa (JP)

(73) Assignee: Sony Corporation (JP)

( * ) Notice: Subject to any disclaimer, the term of this patent is extended or adjusted under 35 U.S.C. 154(b) by 559 days.

(21) Appl. No.: 11/899,982

(22) Filed: Sep. 6, 2007

(65) Prior Publication Data

US 2008/0068963 A1 Mar. 20, 2008

(30) Foreign Application Priority Data

Sep. 11, 2006 (JP) ................ P2006-245391

(51) Int. Cl.
G11B 3/64 (2006.01)
(52) U.S. Cl. ........................................................ 369/84
(58) Field of Classification Search ............... 369/84
See application file for complete search history.

(56) References Cited

U.S. PATENT DOCUMENTS

| | | | | |
|---|---|---|---|---|
| 5,343,452 A | * | 8/1994 | Maeda et al. | 369/59.26 |
| 6,205,104 B1 | * | 3/2001 | Nagashima et al. | 369/59.14 |

FOREIGN PATENT DOCUMENTS

| | | |
|---|---|---|
| JP | 6-309788 A | 11/1994 |
| JP | 7-220392 A | 8/1995 |
| JP | 8-287611 A | 11/1996 |
| JP | 11-086421 A | 3/1999 |
| JP | 11-185402 A | 7/1999 |
| JP | 2000-175150 A | 6/2000 |
| JP | 2000-182326 A | 6/2000 |
| JP | 2000182326 A * | 6/2000 |
| JP | 2001-189912 A | 7/2001 |
| JP | 2001-291318 A | 10/2001 |
| JP | 2002-109870 A | 4/2002 |
| JP | 2002-313018 A | 10/2002 |
| JP | 2003-179876 A | 6/2003 |
| JP | 2004-311019 A | 11/2004 |
| JP | 2004-355792 A | 12/2004 |
| JP | 2005-341036 A | 12/2005 |
| JP | 2006-109489 A | 4/2006 |
| JP | 2006-135781 A | 5/2006 |

OTHER PUBLICATIONS

English translation of Japanese Patent Publication JP, 2000-182326, A.*

* cited by examiner

*Primary Examiner* — Joseph Haley
*Assistant Examiner* — Nicholas Lee
(74) *Attorney, Agent, or Firm* — Lerner, David, Littenberg, Krumholz & Mentlik, LLP

(57) ABSTRACT

An information processing apparatus may include the following elements. A content data generating unit generates first unit data segments constituting first content data and sequentially outputs the data segments. A holding unit is divided into a first holding area and a second holding area and holds the output first unit data segments in the first area. A recording control unit controls a recording operation such that the data segments in the first area are recorded onto at least one of first and second recording media. When second content data is recorded on the first medium, the recording control unit may control a transfer operation in addition to the recording operation such that each second unit data segment constituting the second content data is read from the first medium, the read data segment may be held in the second area, and the held data segment may be transferred to the second medium.

3 Claims, 6 Drawing Sheets

APPARATUS AND METHOD FOR PROCESSING INFORMATION AND PROGRAM THEREFOR

CROSS-REFERENCE TO RELATED APPLICATIONS

This application claims priority from Japanese Patent Application No. JP 2006-245391 filed in the Japanese Patent Office on Sep. 11, 2006, the entire content of which is incorporated herein by reference.

BACKGROUND OF THE INVENTION

1. Field of the Invention

The present invention relates to apparatuses and methods for processing information and programs therefor, and in particular, relates to an information processing apparatus and method capable of recording first content data onto either a first recording medium or a second recording medium in real time and dubbing second content data recorded on the first recording medium onto the second recording medium during recording of the first content data, and a program therefor.

2. Description of the Related Art

According to related art techniques disclosed in, for example, Japanese Unexamined Patent Application Publication Nos. 2006-135781 and 2005-341036, content data recorded on a first recording medium is transferred (dubbed) to a second recording medium.

Further, there are increasing needs to record first content data onto a first or second recording medium in real time and dub second content data recorded on the first recording medium onto the second recording medium during real-time recording of the first content data.

SUMMARY OF THE INVENTION

Related art techniques, including those disclosed in Japanese Unexamined Patent Application Publication Nos. 2006-135781 and 2005-341036, however, do not adequately meet the above-described needs.

The present invention is made in consideration of the circumstances. It may be desirable to record first content data onto either a first recording medium or a second recording medium in real time and dub second content data recorded on the first recording medium onto the second recording medium during real-time recording of the first content data.

According to an embodiment of the present invention, an information processing apparatus for recording content data onto a recording medium may include the following elements. A content data generating unit may generate first unit data segments constituting first content data and sequentially output the generated first unit data segments. A holding unit, which may be divided into at least a first holding area and a second holding area, may hold the first unit data segments sequentially output from the content data generating unit in the first holding area. A recording control unit may control a recording operation such that the unit data segments held in the first holding area of the holding unit may be recorded onto at least one of a first recording medium and a second recording medium. When second content data is recorded on the first recording medium, the recording control unit may control the recording operation and further control a transfer operation such that each second unit data segment constituting the second content data is read from the first recording medium, the read second unit data segment is held in the second holding area of the holding unit, and the second unit data segment held in the second holding area is transferred to the second recording medium.

Preferably, the recording control unit gives a higher priority to the recording operation than to the transfer operation.

Preferably, the recording control unit checks the amount of data held in the first holding area of the holding unit at predetermined time intervals, performs the recording operation when the checked amount is at or above a predetermined level, and performs the transfer operation otherwise.

According to another embodiment of the present invention, there is provided a method for processing information in an information processing apparatus which may include a content data generating unit that generates first unit data segments constituting first content data and sequentially outputs the generated first unit data segments and a holding unit that is divided into at least a first holding area and a second holding area and holds the first unit data segments sequentially output from the content data generating unit in the first holding area. The method may include controlling a recording operation such that the unit data segments held in the first holding area of the holding unit are recorded onto at least one of a first recording medium and a second recording medium, and controlling a transfer operation in addition to the recording operation when second content data is recorded on the first recording medium, the transfer operation being controlled such that each second unit data segment constituting the second content data is read from the first recording medium, the read second unit data segment is held in the second holding area of the holding unit, and the second unit data segment held in the second holding area is transferred to the second recording medium.

According to another embodiment of the present invention, there is provided a program corresponding to the method according to the above-described embodiment of the present invention.

According to the above-described embodiments of the present invention, the information processing apparatus or a recording apparatus which may include the following elements may be a target to be controlled. The apparatus may include the content data generating unit that generates first unit data segments constituting first content data and sequentially outputs the generated first unit data segments and the holding unit that is divided into at least the first holding area and the second holding area and holds the first unit data segments sequentially output from the content data generating unit in the first holding area. The control may be performed as follows: The recording operation is controlled such that the unit data segments held in the first holding area of the holding unit are recorded onto at least one of the first recording medium and the second recording medium. When the second content data is recorded on the first recording medium, the transfer operation is controlled in addition to the recording operation such that each second unit data segment constituting the second content data is read from the first recording medium, the read second unit data segment is held in the second holding area of the holding unit, and the second unit data segment held in the second holding area is transferred to the second recording medium.

As described above, according to each embodiment of the present invention, content data may be recorded (and dubbed) onto recording media. Particularly, first content data may be recorded onto a first or second recording medium in real time and second content data recorded on a first recording medium may be dubbed onto the second recording medium during real-time recording of the first content data.

DETAILED DESCRIPTION

Figure 1:
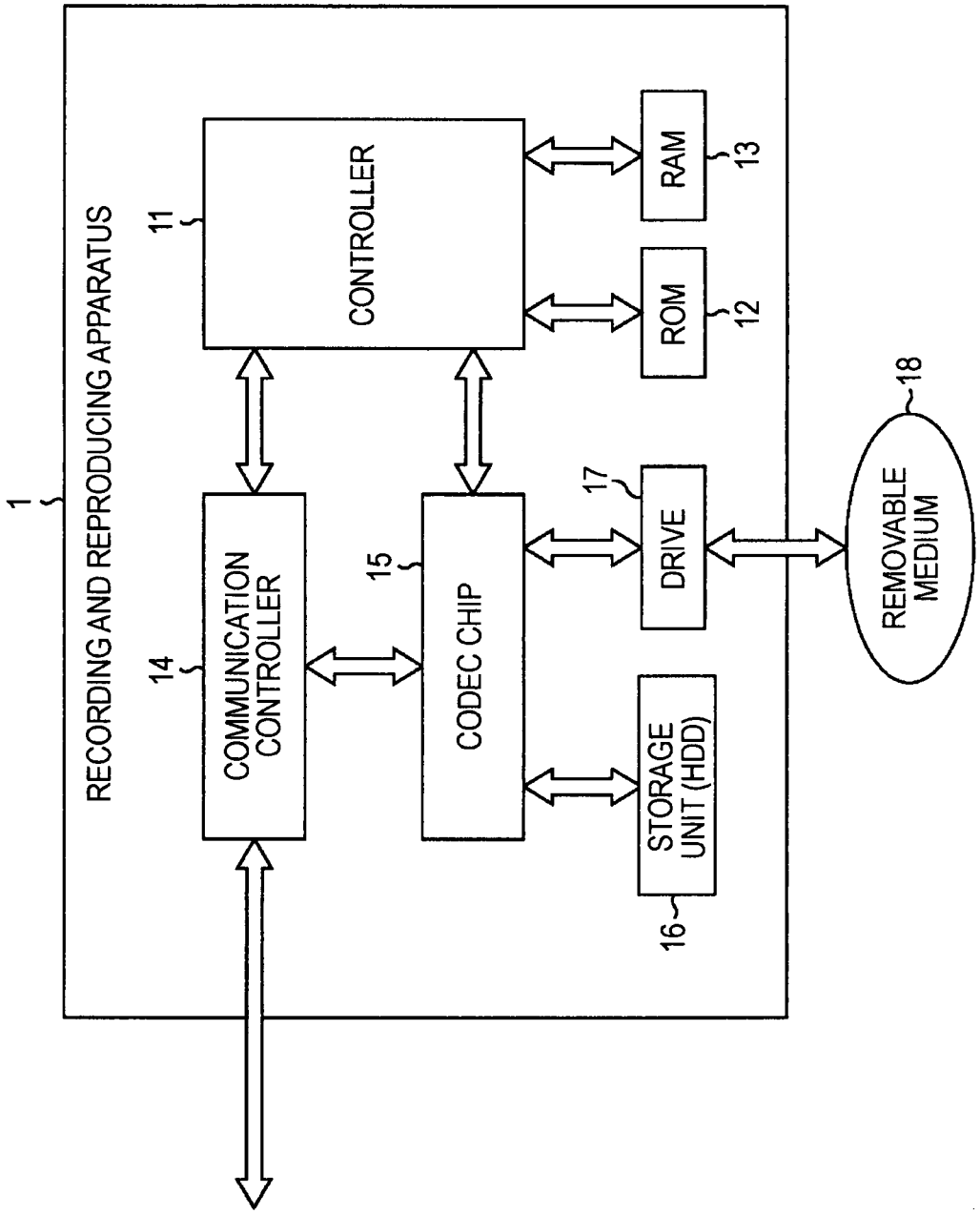
FIG. 1 is a block diagram of a recording and reproducing apparatus, serving as an information processing apparatus, according to an embodiment of the present invention.

Before describing an embodiment of the present invention, the correspondence between the features of the present invention and the specific elements disclosed in an embodiment of the present invention and the drawings is discussed below. This description is intended to assure that embodiments supporting the claimed invention are described in this specification and the drawings. Thus, even if an element in the following embodiments or the drawings is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

According to an embodiment of the present invention, an information processing apparatus (e.g., a recording and reproducing apparatus 1 in FIG. 1) for recording content data onto a recording medium includes the following elements. A content data generating unit (e.g., an encoding/decoding section 21 in FIG. 2) generates first unit data segments constituting first content data and sequentially outputs the generated first unit data segments. A holding unit (e.g., a storage unit 16 in FIG. 2), which is divided into at least a first holding area (e.g., a recording/reproducing storage area 22-1 in FIG. 2) and a second holding area (e.g., a high-speed dubbing transfer area 22-2 in FIG. 2), holds the first unit data segments sequentially output from the content data generating unit in the first holding area (refer to FIGS. 4 and 5). A recording control unit (e.g., an interface section 23 in FIG. 2) controls a recording operation (which is shown by open arrows in FIGS. 4 and 5 and which will be called recording-stream writing in step S5 in FIG. 6) such that the unit data segments held in the first holding area of the holding unit are recorded onto at least one of a first recording medium (e.g., a removable medium 18 in FIG. 2) and a second recording medium (e.g., a storage unit 16 in FIG. 2). When second content data is recorded on the first recording medium, the recording control unit controls the recording operation and further controls a transfer operation (which is shown by filled arrows in FIGS. 3 and 5 and which will be called high-speed dubbing in step S4 in FIG. 6) such that each second unit data segment constituting the second content data is read from the first recording medium, the read second unit data segment is held in the second holding area of the holding unit, and the second unit data segment held in the second holding area is transferred to the second recording medium.

According to another embodiment of the present invention, there is provided a method for processing information in an information processing apparatus (e.g., the recording and reproducing apparatus 1 in FIG. 1) including a content data generating unit (e.g., the encoding/decoding section 21, shown in FIG. 2, of a codec chip 15 in FIG. 1) that generates first unit data segments constituting first content data and sequentially outputs the generated first unit data segments and a holding unit (e.g., the memory 22 of the codec chip 15 in FIG. 1) that is divided into at least a first holding area (e.g., the recording/reproducing storage area 22-1 in FIG. 2) and a second holding area (e.g., the high-speed dubbing transfer area 22-2 in FIG. 2) and holds the first unit data segments sequentially output from the content data generating unit in the first holding area. The method includes the steps (for example, a process shown in FIG. 6) of controlling a recording operation (which is shown by the open arrows in FIGS. 4 and 5 and which is called recording-stream writing in step S5 in FIG. 6) such that the unit data segments held in the first holding area of the holding unit are recorded onto at least one of a first recording medium (e.g., the removable medium 18 in FIG. 2) and a second recording medium (e.g., the storage unit 16 in FIG. 2), and controlling a transfer operation (which is shown by the filled arrows in FIGS. 3 and 5 and which is called high-speed dubbing in step S4 in FIG. 6) in addition to the recording operation when second content data is recorded on the first recording medium, the transfer operation being controlled such that each second unit data segment constituting the second content data is read from the first recording medium, the read second unit data segment is held in the second holding area of the holding unit, and the second unit data segment held in the second holding area is transferred to the second recording medium.

According to another embodiment of the present invention, there is provided a program including the steps of the method according to the above-described embodiment. The program is executed by a computer including, for example, the codec chip 15 in FIG. 1.

An embodiment of the present invention will now be described with reference to the drawings.

FIG. 1 illustrates the structure of a recording and reproducing apparatus according to an embodiment of the present invention.

With reference to FIG. 1, the recording and reproducing apparatus 1 has various functions. For example, the recording and reproducing apparatus 1 can record a television broadcast program in accordance with a set recording schedule. Further, the apparatus 1 can receive predetermined data broadcast over a network, such as the Internet, and record the received data. In addition, the apparatus 1 can record video and audio signals reproduced from a camcorder. In other words, the recording and reproducing apparatus 1 can perform s real-time recording operation. The recording operation will be described in detail later with reference to FIG. 4.

For recording destinations in FIG. 1, a storage unit 16 built in the recording and reproducing apparatus 1 and a removable medium 18 may be used. As will be described later, video and audio signals are converted into data in predetermined form, e.g., MPEG-TS form in the present embodiment and the resultant data is stored in the storage unit 16 or the removable medium 18. In the following description, data in the predetermined form stored in the storage unit 16 or the removable medium 18 will be called content data.

The recording and reproducing apparatus 1 can reproduce content data stored in the storage unit 16 and also reproduce content data recorded on the removable medium 18.

Furthermore, the recording and reproducing apparatus 1 can transfer (dub) the content data stored in the storage unit 16 to the removable medium 18 and transfer (dub) the content data recorded on the removable medium 18 to the storage unit 16. In other words, the recording and reproducing apparatus 1 can perform a transfer operation. The transfer operation will be described in detail later with reference to FIG. 3.

The recording and reproducing apparatus 1 includes a controller 11, a read only memory (ROM) 12, a random access memory (RAM) 13, a communication controller 14, a codec chip 15, a storage unit 16, and a drive 17.

The controller 11 controls the entire recording and reproducing apparatus 1. For example, the controller 11 controls the codec chip 15 and the communication controller 14. The codec chip 15 and the communication controller 14 will be described below. Upon controlling the codec chip 15 or the codec chip 15, the controller 11 can perform various processes in accordance with a program stored in the ROM 12 or the storage unit 16 as necessary. The RAM 13 appropriately stores a program executed by the controller 11 and data.

The communication controller 14 controls communication with the outside.

For example, the communication controller 14 receives broadcast signals, such as terrestrial analog broadcast signals, broadcasting-satellite (BS) analog broadcast signals, terrestrial digital broadcast signals, or BS digital broadcast signals, and provides video and audio signals related to a television program based on the received signals to the codec chip 15.

The communication controller 14 further includes a function of connecting to a network, such as the: Internet, receives predetermined data broadcast over a predetermined network, and supplies the received data to the codec chip 15.

For example, the communication controller 14 controls communication with an external device, such as a camcorder, connected via a dedicated i.LINK cable. The term "i.LINK" is a trademark of Sony Corporation, the assignee of this application, and is an IEEE (Institute of Electrical and Electronics Engineers) 1394 digital serial interface standard that offers high-speed communications. Therefore, the communication controller 14 passes on various information blocks (e.g., video and audio signals and control signals) sent in accordance with the IEEE1394 standard between the external device and the controller 11 and those between the external device and the codec chip 15. For example, the communication controller 14 transmits a control signal, e.g., a command, supplied from the controller 11 to the external device, thus controlling the operation of the external device. For example, when receiving video and audio signals transmitted from the external device, the communication controller 14 can supply the received video and audio signals to the codec chip 15. On the other hand, when being supplied with video and audio signals from the codec chip 15, the communication controller 14 can transmit the supplied video and audio signals to the external device.

During recording, the codec chip 15 performs encoding according to a compression encoding scheme, such as MPEG (Moving Picture Experts Group), on the video and audio signals supplied from the communication controller 14 and outputs encoded data (hereinafter, also referred to as a recording stream) to the storage unit 16 or the drive 17. In other words, the recording stream is stored as content data into the storage unit 16. Alternatively, the recording stream is recorded onto the removable medium 18 through the drive 17.

During reproducing, the codec chip 15 performs decoding according to a scheme, related to the above-described compression encoding, on content data read from the storage unit 16 or content data read from the removable medium 18 through the drive 17 and supplies video and audio signals, obtained by decoding, to the communication controller 14.

During transfer, the codec chip 15 transfers content data read from the storage unit 16 to the removable medium 18 through the drive 17. Alternatively, the codec chip 15 transfers content data read from the removable medium 18 through the drive 17 to the storage unit 16. At that time, the content data read from the storage unit 16 or the removable medium 18 is not supplied to the controller 11 and is not decoded. The content data is transferred as it is to the removable medium 18 or the storage unit 16. Therefore, the content data can be transferred at a higher speed than the related art. Hereinafter, the transfer operation of the codec chip 15 will be called a "high-speed dubbing operation".

Furthermore, the codec chip 15 can perform the recording or reproducing operation and the high-speed dubbing operation concurrently, i.e., in parallel. This will be described in detail below with reference to FIGS. 5 and 6.

The storage unit 16 includes, for example, a hard disk drive (HDD) and stores content data supplied from the codec chip 15. The storage unit 16 further reads stored content data and supplies the read data to the codec chip 15.

The drive 17 records content data supplied from the codec chip 15 to the removable medium 18. Furthermore, the drive 17 reads content data recorded on the removable medium 18 and supplies the read data to the codec chip 15.

The removable medium 18 may include a magnetic disk (including a flexible disk), an optical disk (e.g., a compact disc-read only memory (CD-ROM) or a digital versatile disc (DVD)), a magneto-optical disk (including a MiniDisc (MD)), a magnetic tape, or a semiconductor memory.

In the present embodiment, it is assumed that the removable medium 18 is a Blu-ray disc. Accordingly, content data is recorded in a recording format defined by the Blu-ray Disc Founders, i.e., in transport stream (TS) form onto the removable medium 18. For the purpose of the above-described high-speed dubbing, when content data is stored into the storage unit 16, the data is similarly stored in TS form.

Figure 2:
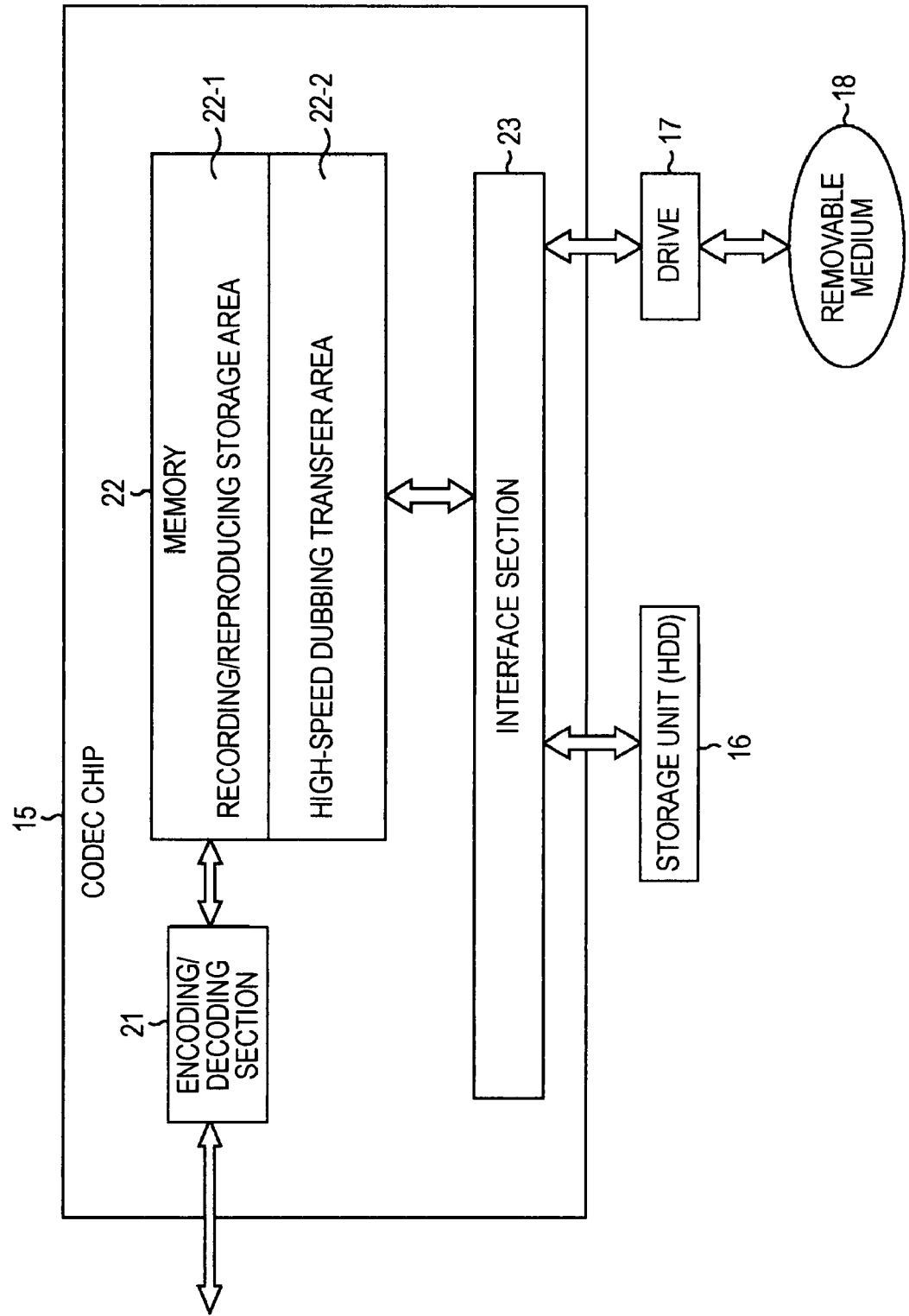
FIG. 2 is a block diagram of the detailed structure of a codec chip in FIG. 1.

FIG. 2 illustrates the detailed structure of the codec chip 15.

Referring to FIG. 2, the codec chip 15 includes an encoding/decoding section 21, a memory 22, and an interface section 23.

The encoding/decoding section 21 operates during the recording or reproducing operation to perform the above-described compression encoding or decoding.

Each unit data segment is subjected to the compression encoding. In other words, the encoding/decoding section 21 sequentially outputs encoded data (unit data segments) in predetermined units. The sequentially continuously output unit data segments constitute a recording stream. In this case, the unit data segments sequentially output from the encoding/decoding section 21 are temporarily stored in the memory 22.

More specifically, the memory 22 includes at least a recording/reproducing storage area 22-1 and a high-speed dubbing transfer area 22-2. Each unit data segment output from the encoding/decoding section 21 is temporarily stored in the storage area 22-1. The storage in the storage area 22-1 will be described in detail below with reference to FIG. 4.

Target data subjected to decoding by the encoding/decoding section 21 is each unit data segment stored in the storage area 22-1.

On the other hand, in the above-described high-speed dubbing operation, content data read out in predetermined units from the storage unit 16 or the removable medium 18 is stored in the transfer area 22-2. The storage in the transfer area 22-2 will be described later with reference to FIG. 3.

The interface section 23 controls relay of information, mainly unit data segments in the present embodiment, between the storage unit 16 or the drive 17 and the memory 22.

Concrete examples of the relay control will now be described. Specifically, a processing example of the interface section 23 in a case where the high-speed dubbing operation is performed independently, that in a case where the recording operation is performed independently, and that in a case where the high-speed dubbing operation and the recording operation are performed concurrently will now be described individually.

Figure 3:
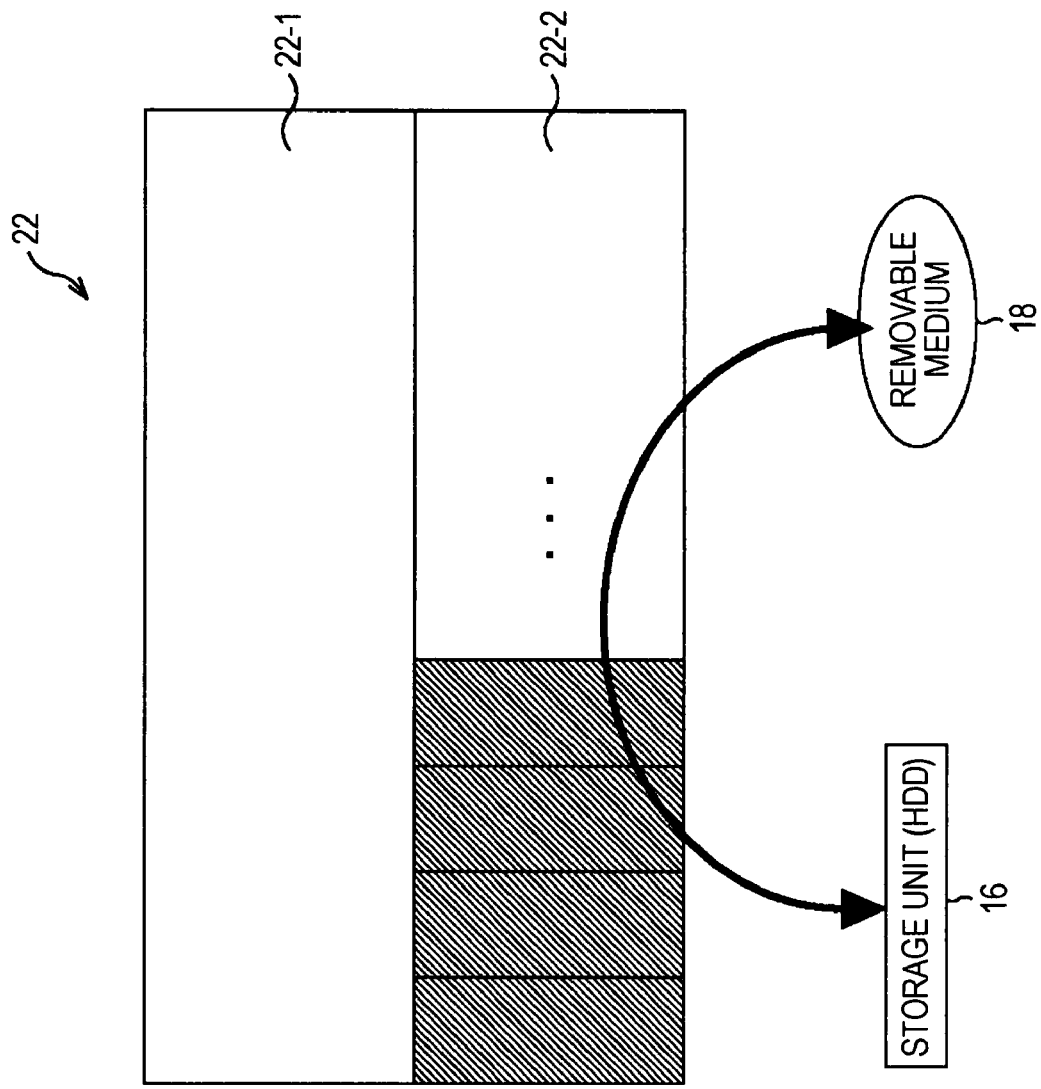
FIG. 3 is a diagram illustrating unit data segments subjected to high-speed dubbing.

FIG. 3 schematically explains the processing example of the interface section 23 in the case where the high-speed dubbing operation is performed independently.

Referring to FIG. 3, in the high-speed dubbing operation, the interface section 23 reads out content data (in MPEG-TS form) in predetermined units from the storage unit 16 or the removable medium 18 and temporarily stores the read data in the transfer area 22-2 of the memory 22. In FIG. 3, each rectangular hatched portion represents one unit data segment. Specifically, for example, the interface section 23 checks the transfer area 22-2 of the memory 22 at predetermined time intervals. If the transfer area 22-2 has a predetermined amount or more of free space, the interface section 23 reads out one or more unit data segments from the storage unit 16 or the removable medium 18 and writes the read data segments into the free space. Hereinafter, this processing by the interface section 23 will be called "reading procedure during high-speed dubbing".

Furthermore, the interface section 23 checks the transfer area 22-2 of the memory 22 at predetermined time intervals, reads out one or more unit data segments stored in the transfer area 22-2 for a predetermined time, and writes the read data segments into the storage unit 16 or the removable medium 18. Hereinafter, this processing by the interface section 23 will be termed "writing procedure during high-speed dubbing".

Executing the above-described reading and writing procedures during high-speed dubbing (hereinafter, those procedures will be collectively called "high-speed dubbing process") realizes high-speed copying of content data through no main memory (e.g., the RAM 13 in FIG. 1).

More properly, the interface section 23 does not directly read out the content data from the removable medium 18 as shown in FIG. 2. The interface section 23 obtains the content data read from the removable medium 18 through the drive 17. Similarly, the interface section 23 does not directly write content data into the removable medium 18. The interface section 23 supplies the content data to the drive 17 and the drive 17 writes the data into the removable medium 18.

Figure 4:
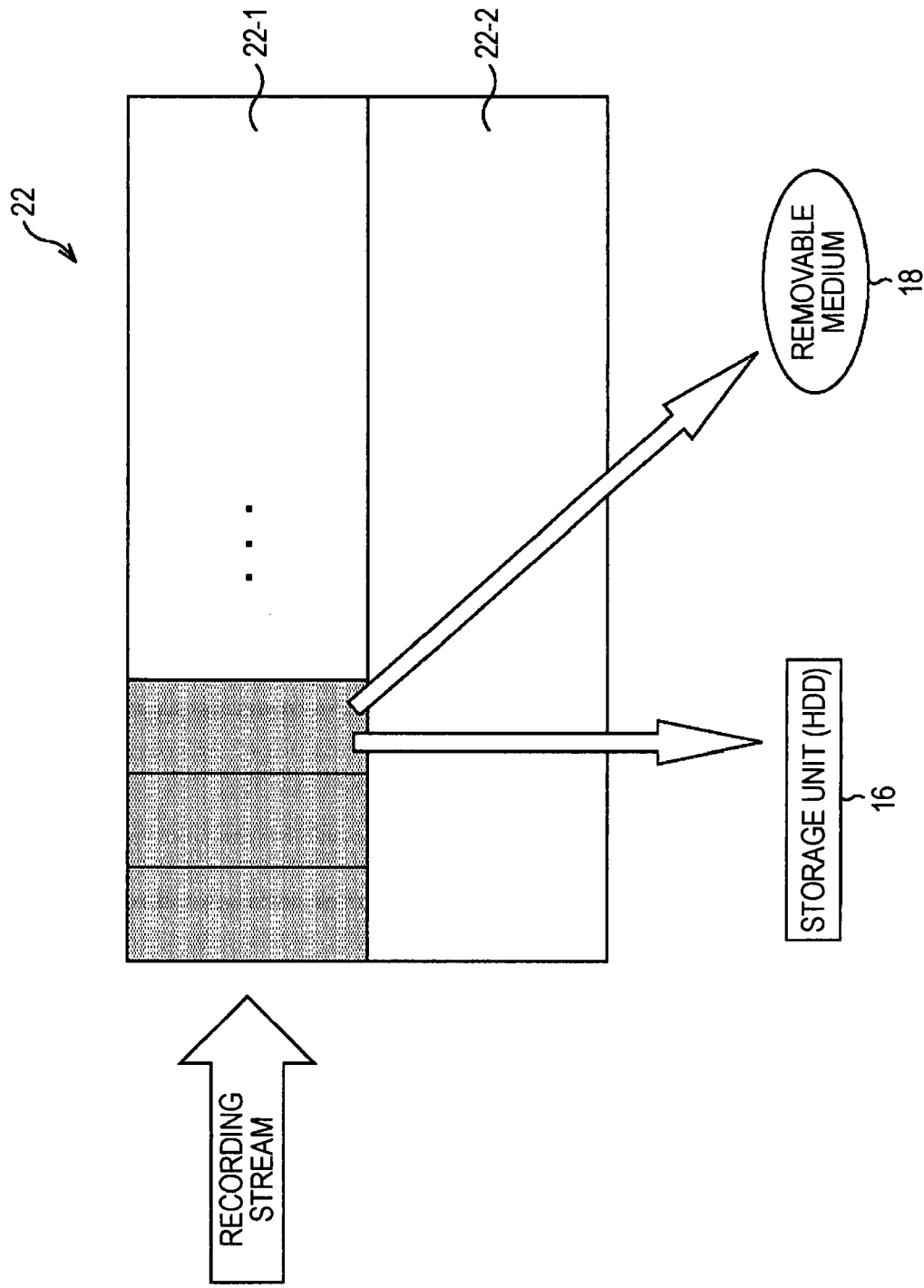
FIG. 4 is a diagram illustrating unit data segments subjected to recording-stream writing.

FIG. 4 schematically explains the processing example of the interface section 23 in the case where the recording operation is performed independently.

Referring to FIG. 4, in the recording operation, unit data segments constituting a recording stream are sequentially output from the encoding/decoding section 21 and are then stored into the storage area 22-1 of the memory 22. In FIG. 4, each rectangular halftone portion represents one unit data segment. The interface section 23 checks whether the amount of unit data segments stored in the storage area 22-1, i.e., the amount of data buffer is at or above a predetermined level.

When the amount of data buffer of the storage area 22-1 in the memory 22 is at or above the predetermined level, the recording stream stored in the storage area 22-1, i.e., a set of unit data segments stored in the storage area 22-1 at that time is written into the storage unit 16 or the removable medium 18. Hereinafter, this processing performed when the amount of data buffer of the storage area 22-1 in the memory 22 is at or above the predetermined level will be called "recording-stream writing process".

Since the memory 22 is divided into the recording/reproducing storage area 22-1 used during the recording operation and the high-speed dubbing transfer area 22-2 used during the high-speed dubbing operation, the recording operation and the high-speed dubbing operation can be concurrently performed as described above.

The processing example of the interface section 23 in this case where the recording operation and the high-speed dubbing operation are concurrently performed will now be described with reference to FIGS. 5 and 6.

Figure 5:
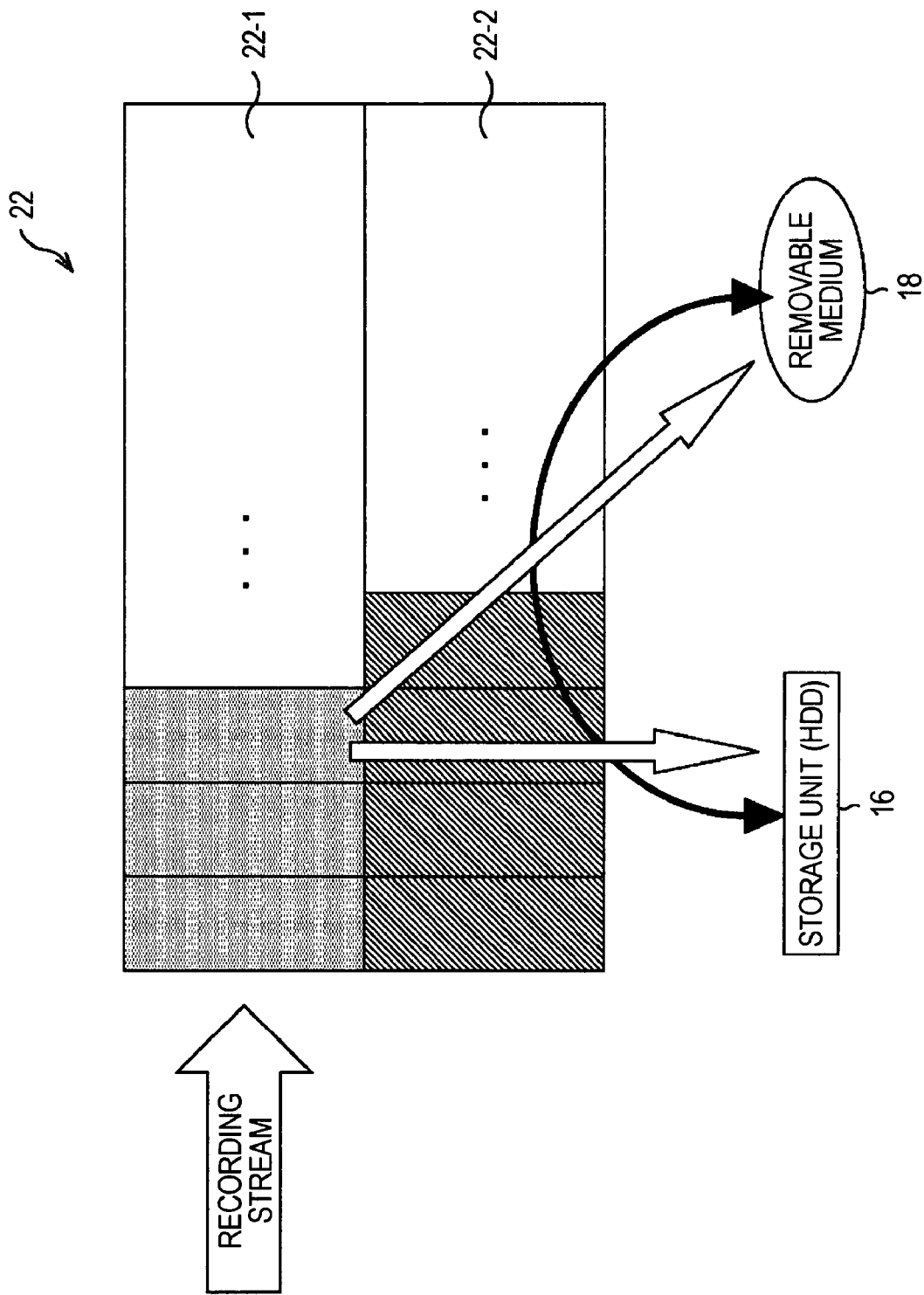
FIG. 5 is a diagram explaining a high-speed-dubbing and recording process.

In other words, the interface section 23 sequentially performs the recording-stream writing process, shown by open arrows in FIG. 5, and the high-speed dubbing process, shown by filled arrows in FIG. 5, so that the recording operation and the high-speed dubbing operation can be performed concurrently, i.e., in parallel.

Each unit data segment (i.e., each rectangular halftone portion in FIGS. 4 and 5) subjected to the recording-stream writing process and each unit data segment (i.e., each rectangular hatched portion in FIGS. 3 and 5) subjected to the high-speed dubbing process shown by the filled arrows in FIG. 5 are obtained in accordance with the same rule in the present embodiment such that the respective unit data segments have the same size. The size of each unit data segment is not limited to that in the present embodiment. Each unit data segment subjected to the recording-stream writing process and that subjected to the high-speed dubbing process may be obtained so as to have different sizes in accordance with different rules.

Strictly, the recording-stream writing process and the high-speed dubbing process are not simultaneously performed. When one of those processes is performed at a certain time, the other process is not performed. Therefore, for example, only the recording-stream writing process or high-speed dubbing process may be successively performed unless a rule to determine whether to perform either the recording-stream writing process or the high-speed dubbing process is determined.

In the latter case where the high-speed dubbing process alone is successively performed, the recording-stream writing process is not performed during the high-speed dubbing process. This leads to the following problem. Since the recording operation is performed in real time, specifically, the encoding/decoding section 21 in FIG. 2 performs real-time encoding, the recording stream is continuously supplied at a predetermined rate to the memory 22. The memory capacity of the storage area 22-1 is limited. If the recording-stream writing process is not performed, therefore, the number of unit data segments stored in the storage area 22-1, i.e., the amount of data buffer is increasing. The memory capacity may be finally filled, causing memory overflow. Disadvantageously, if content data, which is written in the removable medium 18 or the storage unit 16 before and after the memory overflow, is reproduced, content with partially missing images and sounds is provided to a user.

The above-described problem does not occur in the former case where only the recording-stream writing process is successively performed. The reason is that the high-speed dubbing process is not a real-time operation. In other words, the amount of data to be read is controlled in the reading procedure during high-speed dubbing, thus preventing memory overflow in the transfer area 22-2 of the memory 22.

In other words, to avoid the above-described problem, a rule to determine whether to perform either the recording-stream writing process or the high-speed dubbing process may be appropriately determined. The rule is not restricted so long as the recording-stream writing process is performed in accordance with the rule before memory overflow occurs in the storage area 22-1 of the memory 22. In the present embodiment, the following rule may be used.

According to the rule in the present embodiment, the memory 22 is checked at predetermined time intervals. When the amount of data buffer of the storage area 22-1 is at or above the predetermined level, the recording-stream writing process is performed. Otherwise, the high-speed dubbing process is performed. FIG. 6 is a flowchart of processing (hereinafter, referred to as a high-speed-dubbing and recording process) by the interface section 23 in the case where the recording operation and the high-speed dubbing operation are performed concurrently (i.e., in parallel) in accordance with the above-described rule.

Figure 6:
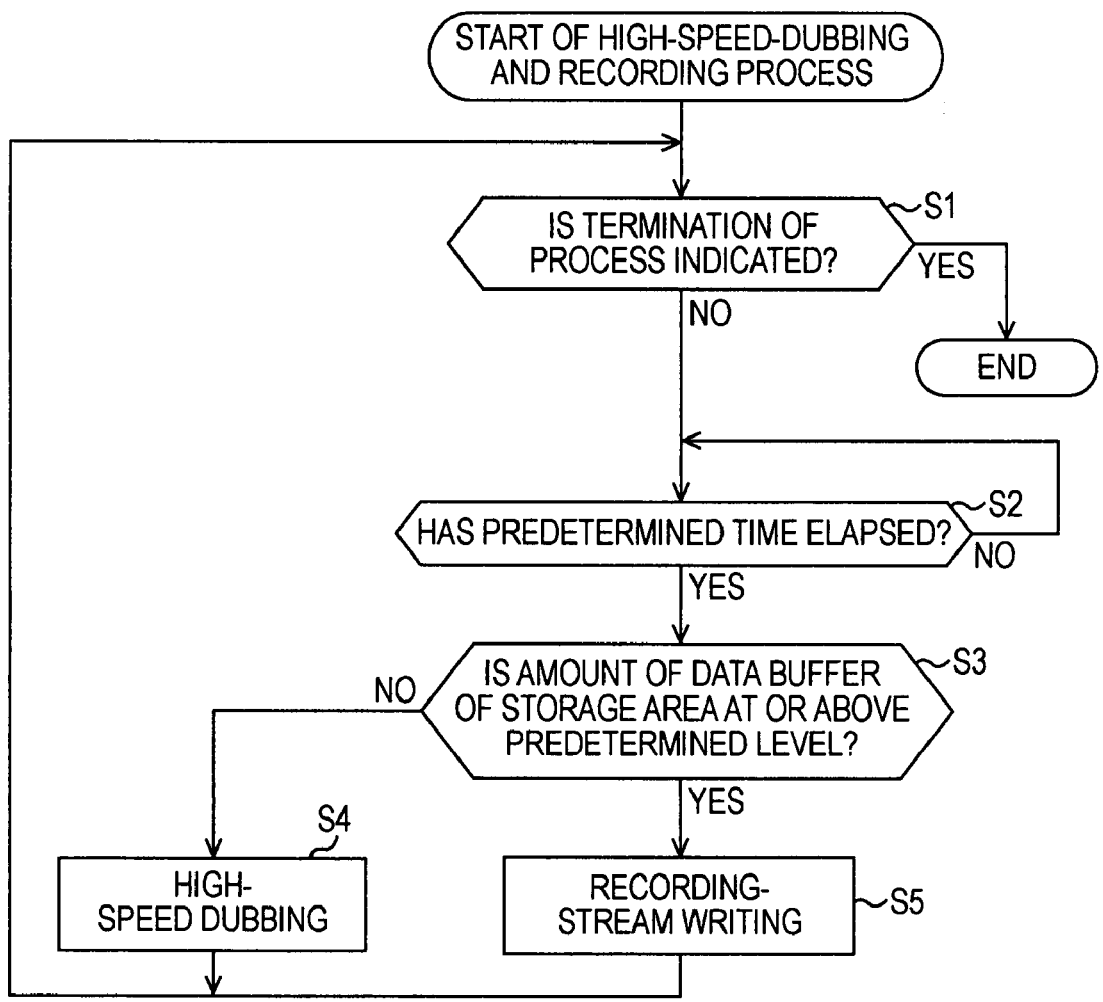
FIG. 6 is a flowchart of the high-speed-dubbing and recording process.

Referring to FIG. 6, in step S1, the interface section 23 determines whether termination of the process is indicated.

Criteria used in step S1 are not particularly limited. A designer may freely set criteria. In the present embodiment, the following criteria for determination are used. If high-speed dubbing is finished and any data constituting a recording stream is not output from the encoding/decoding section 21 for a predetermined time, it is determined that the termination of the process is indicated.

If it is determined in step S1 that the termination of the process is indicated, the high-speed-dubbing and recording process is terminated.

If it is determined in step S1 that the termination of the process is not indicated, the process proceeds to step S2.

In step S2, the interface section 23 determines whether the predetermined time has elapsed.

If it is determined in step S2 that the predetermined time has not elapsed, the process is returned to step S2. Whether the predetermined time has elapsed is again determined in step S2.

In other words, the determination in step S2 is repeated until the predetermined time has elapsed. If YES in step S2, i.e., it is determined that the predetermined time has elapsed, the process proceeds to step S3.

In step S3, the interface section 23 determines whether the amount of data buffer of the recording/reproducing storage area 22-1 in the memory 22 is at or above the predetermined level.

If it is determined in step S3 that the amount of data buffer of the storage area 22-1 is below the predetermined level, the interface section 23 performs high-speed dubbing in step S4. After that, the process is returned to step S1 and step S1 and the subsequent steps are repeated.

On the other hand, if it is determined in step S3 that the amount of data buffer of the storage area 22-1 is at or above the predetermined level, the interface section 23 performs recording-stream writing in step S5. After that, the process is returned to step S1 and step S1 and the subsequent steps are repeated.

Recording media to which content data is written or transferred are the storage unit 16 and the removable medium 18 in the present embodiment. The media are not limited to those in the present embodiment. In other words, the above-described high-speed dubbing can be applied to a process of transferring content data recorded on a first recording medium to a second recording medium. Consequently, the content data (stream) recorded on the first recording medium can be dubbed onto the second recording medium without being decoded and degraded. In other words, since decoding is not needed, high-speed dubbing can be achieved. In the high-speed dubbing operation, the content data is temporarily stored in a memory (e.g., the memory 22 in FIG. 2), serving as a save area. If the memory is included in a unit (e.g., the codec chip 15 in FIGS. 1 and 2) for performing high-speed dubbing, the content data to be transferred may be sent through this unit. It is unnecessary to store the content data into a main memory (e.g., the RAM 13 in FIG. 1) and then transmit the data in a manner similar to the related art. Thus, higher-speed dubbing can be realized.

Since the memory 22 is divided into at least two areas, i.e., the recording/reproducing storage area 22-1 and the high-speed dubbing transfer area 22-2, data streams (content data sets) of respective channels for the recording and dubbing operations can be controlled in a time sharing manner.

The above-described series of processing may be executed by hardware or software. When the series of processing is executed by software, a program constituting the software is installed through a program recording medium into a computer incorporated in dedicated hardware or into a computer appropriately including components similar to the codec chip 15 and the controller 11 in the recording and reproducing apparatus 1 in FIG. 1 or a multi-purpose personal computer, the computers being capable of executing various functions by installing various programs.

Program recording media for storing a computer-executable program to be installed into a computer include not only the removable medium (package medium) 18, such as a magnetic disk (including a flexible disk), an optical disk (e.g., a compact disc read-only memory (CD-ROM) or a digital versatile disc (DVD)), a magneto-optical disk, or a semiconductor memory, but also the ROM 12 and the hard disk constituting the storage unit 16, in each of which a program is temporarily or permanently stored. A program is stored into a program recording medium using a wire or wireless communication medium, such as a local area network, the Internet, or digital satellite broadcasting, through the communication controller 14 as necessary.

In this specification, steps describing the program stored in a program recording medium include not only processing in which the steps are carried out in time series in the described order but also processing in which the steps are carried out in parallel or individually rather than being implemented in time series.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus for recording content data onto a recording medium, comprising:
    a content data generating unit that generates first unit data segments constituting first content data and sequentially outputs the generated first unit data segments;
    a holding unit that is divided into at least a first holding area and a second holding area and holds the first unit data segments sequentially output from the content data generating unit in the first holding area; and
    a recording control unit that controls a recording operation such that the unit data segments held in the first holding area of the holding unit are recorded onto at least one of a first recording medium and a second recording medium, wherein
    when second content data including a plurality of second unit data segments is recorded on the first recording medium, the recording control unit controls the recording operation and further controls a transfer operation such that each second unit data segment constituting the second content data is read from the first recording medium, the read second unit data segment is held in the second holding area of the holding unit, and the second unit data segment held in the second holding area is transferred to the second recording medium, the holding unit is a memory, the first holding area is a recording/reproducing storage area of the memory, and the second holding area is a high-speed dubbing transfer area of the memory, the transfer operation is a high-speed-dubbing process, the memory is checked at predetermined time intervals, and when the amount of data in the first holding area is at or above a predetermined level the recording operation is performed, otherwise the high-speed-dubbing process is performed, and the recording operation is performed in real time while being performed in a time sharing manner with the high-speed-dubbing process.

2. A method for processing information in an information processing apparatus including a content data generating unit that generates first unit data segments constituting first content data and sequentially outputs the generated first unit data segments and a holding unit that is divided into at least a first holding area and a second holding area and holds the first unit data segments sequentially output from the content data generating unit in the first holding area, the method comprising:

controlling a recording operation such that the unit data segments held in the first holding area of the holding unit are recorded onto at least one of a first recording medium and a second recording medium; and controlling a transfer operation in addition to the recording operation when second content data including a plurality of second unit data segments is recorded on the first recording medium, the transfer operation being controlled such that each second unit data segment constituting the second content data is read from the first recording medium, the read second unit data segment is held in the second holding area of the holding unit, and the second unit data segment held in the second holding area is transferred to the second recording medium, the holding unit is a memory, the first holding area is a recording/reproducing storage area of the memory, and the second holding area is a high-speed dubbing transfer area of the memory, the transfer operation is a high-speed-dubbing process, the memory is checked at predetermined time intervals, and when the amount of data in the first holding area is at or above a predetermined level the recording operation is performed, otherwise the high-speed-dubbing process is performed, and the recording operation is performed in real time while being performed in a time sharing manner with the high-speed-dubbing process.

3. A non-transitory computer-readable medium storing a program that is executed by a computer for controlling a recording apparatus including a content data generating unit that generates first unit data segments constituting first content data and sequentially outputs the generated first unit data segments and a holding unit that is divided into at least a first holding area and a second holding area and holds the first unit data segments sequentially output from the content data generating unit in the first holding area, the program comprising:

controlling a recording operation such that the unit data segments held in the first holding area of the holding unit are recorded onto at least one of a first recording medium and a second recording medium; and controlling a transfer operation in addition to the recording operation when second content data including a plurality of second unit data segments is recorded on the first recording medium, the transfer operation being controlled such that each second unit data segment constituting the second content data is read from the first recording medium, the read second unit data segment is held in the second holding area of the holding unit, and the second unit data segment held in the second holding area is transferred to the second recording medium, the holding unit is a memory, the first holding area is a recording/reproducing storage area of the memory, and the second holding area is a high-speed dubbing transfer area of the memory, the transfer operation is a high-speed-dubbing process, the memory is checked at predetermined time intervals, and when the amount of data in the first holding area is at or above a predetermined level the recording operation is performed, otherwise the high-speed-dubbing process is performed, and the recording operation is performed in real time while being performed in a time sharing manner with the high-speed-dubbing process.

* * * * *